United States Patent [19]

Corbishley

[11] Patent Number: 5,795,102

[45] Date of Patent: Aug. 18, 1998

[54] MARINE AND SUBMARINE APPARATUS

[76] Inventor: Terrence Jeffrey Corbishley, The Downs, 108 Heath Road., Petersfield, Hampshire, GU31 4EL, United Kingdom

[21] Appl. No.: 789,065

[22] Filed: Jan. 27, 1997

Related U.S. Application Data

[63] Continuation of Ser. No. 374,607, Jan. 23, 1995, abandoned.

[30] Foreign Application Priority Data

| Aug. 12, 1992 | [GB] | United Kingdom | 9217060 |
| Aug. 12, 1992 | [GB] | United Kingdom | 9217061 |
| Oct. 6, 1992 | [GB] | United Kingdom | 9221020 |

[51] Int. Cl.$^6$ ............................ F16L 59/14; F16L 11/133
[52] U.S. Cl. ............................ 405/171; 405/158; 138/149; 138/DIG. 9; 174/101.5
[58] Field of Search ............................ 405/157, 158, 405/171; 441/1, 30, 136; 138/149, DIG. 9; 174/101.5

[56] References Cited

U.S. PATENT DOCUMENTS

| 3,045,709 | 7/1962 | Rapp | 138/DIG. 69 |
| 3,407,835 | 10/1968 | Rolfes | 137/340 |
| 3,703,012 | 11/1972 | Mast et al. | 441/136 |
| 3,733,629 | 5/1973 | Beavbien | 441/1 |
| 3,768,892 | 10/1973 | Ahlstone | 138/DIG. 9 |
| 3,935,632 | 2/1976 | Maxson | 29/455 |
| 4,003,210 | 1/1977 | Bostroem | 405/171 X |
| 4,021,589 | 5/1977 | Copley | 428/68 |
| 4,052,862 | 10/1977 | Lamy | 405/171 |
| 4,110,554 | 8/1978 | Moore et al. | 174/101.5 |
| 4,393,901 | 7/1983 | Beck | 138/145 |
| 4,744,842 | 5/1988 | Webster et al. | 138/DIG. 9 |
| 4,963,420 | 10/1990 | Jarrin et al. | 428/36.9 |

FOREIGN PATENT DOCUMENTS

| 0 059 017 | 9/1982 | European Pat. Off. . |
| 0 177 475 B1 | 4/1986 | European Pat. Off. . |
| 0 188 340 | 7/1986 | European Pat. Off. . |
| 0 189 720 | 5/1989 | European Pat. Off. . |
| 0 473 215 A1 | 3/1992 | European Pat. Off. . |
| 0 521 582 A1 | 1/1993 | European Pat. Off. . |
| 1240554 | 7/1959 | France | 405/171 |
| 2 598 713 | 11/1987 | France . |
| 234535 | 5/1925 | United Kingdom . |
| 790490 | 2/1958 | United Kingdom . |
| 1048961 | 11/1966 | United Kingdom . |
| 1 368 665 | 10/1974 | United Kingdom . |
| 1 429 246 | 3/1976 | United Kingdom . |
| 1 441 208 | 6/1976 | United Kingdom . |
| 1 500 560 | 2/1978 | United Kingdom . |
| 2 106 093 | 4/1983 | United Kingdom . |
| 1083185 | 9/1997 | United Kingdom . |
| WO 84/00798 | 3/1984 | WIPO . |
| WO 88/08099 | 10/1988 | WIPO . |

*Primary Examiner*—Tamara L. Graysay
*Assistant Examiner*—Frederick L. Lagman
*Attorney, Agent, or Firm*—Beveridge, Degrandi, Weilacher & Young, LLP

[57] ABSTRACT

The invention relates to improvements in an apparatus, such as pipelines (2) and associated equipment and to a method of making, insulating, providing buoyancy to, recovering and installing submarine apparatus. The marine or submarine apparatus comprises an impermeable enclosure (1) associated with the apparatus (2), which enclosure is tightly packed with hollow microspheres (3) to a density where, when submerged in use, the internal pressure of the microspheres is greater than or substantially equal to the water pressure on the apparatus.

47 Claims, 7 Drawing Sheets

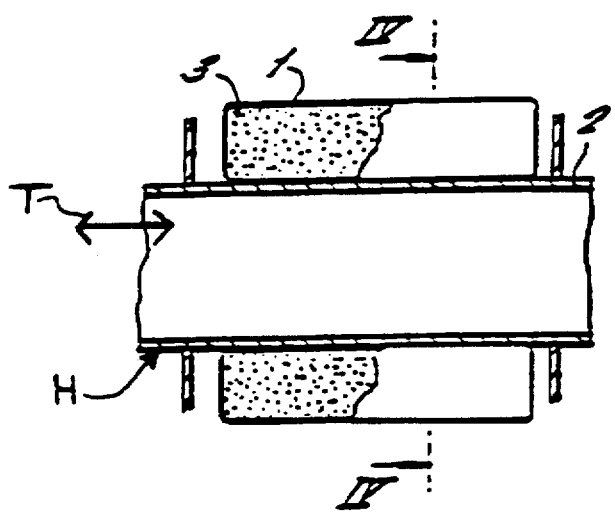
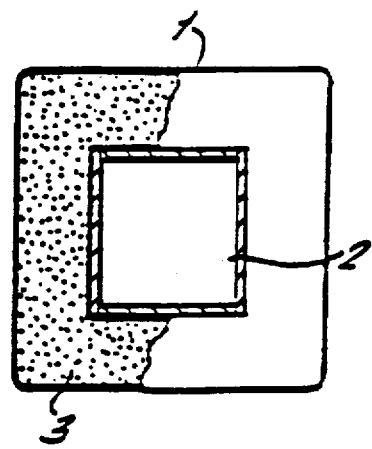
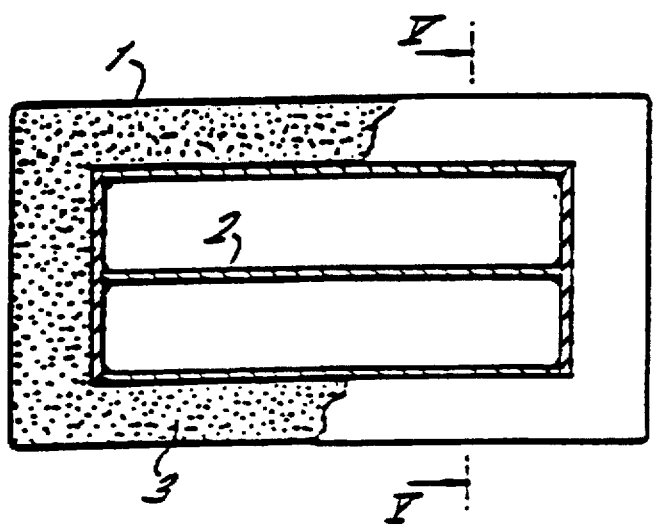
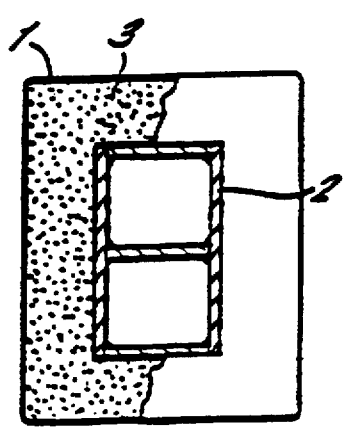

MARINE AND SUBMARINE APPARATUS

This application is a continuation of application Ser. No. 08/374,607, filed Jan. 23, 1995, now abandoned which application is entirely incorporated herein by reference.

The invention relates to improvements in marine and submarine apparatus, such as pipelines and associated equipment, and to a method of making, insulating, providing buoyancy to, recovering and installing submarine apparatus.

With the growth of the offshore oil and gas industry, it has been necessary to install prefabricated pipelines between offshore oil and gas fields and onshore processing facilities and between different offshore locations. These may be for processing purposes or for loading the oil or gas into shuttle tankers from offshore loading buoys.

To meet the need to install pipelines with a high degree of reliability, it is possible to use barges and vessels with several aligned welding, inspection and coating stations that can fabricate a pipeline from a large number of short lengths of coated pipe, typically 10 meters long. The welded joints of the pipeline have then to be inspected and coated before the pipeline is lowered to the sea bed down a long curved stringer or ramp. As an alternative, suitable for pipelines of a smaller diameter, the pipeline will be supplied in long lengths which are found on a large reel housed on a vessel. The pipeline is unreeled from the vessel, straightened to remove the curvature created by the reeling process, and then lowered directly into the sea and down to the sea bed.

A further alternative is to fabricate, at a suitable shore site, a bundled assembly formed of a pipeline or group of pipelines housed within a large diameter outer steel pipeline, known as a carrier pipe. The void space within the carrier pipe and around the pipelines housed within it is sealed to prevent the ingress of water when towed. For towing from its shore site to its installation site, the fabricated bundle assembly is needed to be provided with buoyancy and preferably having just sufficient submerged unit weight (i.e. it should be negatively buoyant) for the purposes of towing. Towing can be either on-bottom, off-bottom or controlled depth towing.

It is also often necessary to tow and install other equipment, apart from pipelines, such as platforms, mainfolds, templates, storage units, valves, well christmas trees and other structures, which also need to be provided with buoyancy to aid their installation. Where apparatus which is only partially submerged is to be installed, positive buoyancy must be provided.

Pipelines and underwater equipment are often needed to be recovered, for example for repair, and positive buoyancy is required to aid recovery.

The buoyancy of a structure is presently achieved by the introduction of a medium, having a specific gravity less than water, typically air or other gas. Other suitable mediums include open or closed cell foams. The gas and foams compress with increasing applied pressure at deeper and deeper depths of water and will correspondingly expand with decreasing applied pressure. Buoyancy may also be provided by more consolidated materials, again with a specific gravity less than water, such as polyurethane which has been blown or foamed with a gas to form a closed cell structure. Polyurethane foams and the like are usually encapsulated in a thin skin of more dense material following application of the buoyant material.

During installation, operation or recovery submarine pipelines and equipment are liable to mechanical damage when they suffer impact, for example from fishing gear such as trawl boards, beams, anchors or heavy objects dropped overboard from vessels. The protection of pipelines lying on the sea bed is currently achieved by applying a substantial layer of concrete or elastomeric material. For towed bundles of pipes, the carrier pipe presently also provides protection to the individual pipelines housed within it.

In use, pipelines and underwater equipment are often required to maintain certain fluid temperatures, preventing adverse affects such as "hydrate" formation or wax deposition. Thermal insulation of the equipment helps to avoid this and is currently achieved by the application to the external surface of the equipment suitable insulation material. The materials are presently applied by various processes including extrusion, impingement, wrapping and casting.

One prior art solution can be found in U.S. Pat. No. 3,935,632 which is a method of preparing an insulated negative buoyancy conduit. In this method a jacket is placed around the conduit and the annular space between the jacket and the conduit is filled with an insulating porous filler and a resin forming composition. The resultant structure has a low density porous filler such as hollow microspheres or expanded foam integrally cast and embedded in the resin. This combined with the jacket adds sufficient weight to the conduit to ensure that it settles at the bottom of any body of water in which it is installed.

The disadvantage of this invention is that the resulting structure is not a compliant structure, the buoyancy cannot be varied for towing and use and the preferred cement jacket is liable to be damaged from impact during installation, in use or during recovery.

A further prior art solution can be found in FR-A-2598713 which describes a new filling and buoyancy material which can be used in the assembly of cables or flexible pipes to provide to the assembly buoyancy and resistance to hydrostatic and uniaxial pressure. This material comprises 20–50% by volume of a hollow lightening filler, comprising microspheres of flue dust and between 50–80% by volume a thermoplastic resin. The resulting structure does not provide structural compliance to the enclosure or other structural members which it covers.

It is an object of the present invention to provide marine and submarine apparatus, including pipelines and associated equipment, which can be provided with temporary or permanent buoyancy, or the submerged unit weight thereof can be reduced, to aid its installation or recovery, which apparatus may additionally be thermally insulated and protected from mechanical impact damage using the buoyancy providing means.

It is a further object of the present invention to provide a method of installing and recovering marine and submarine apparatus.

According to the invention there is provided marine or submarine apparatus comprising an impermeable enclosure associated with said apparatus, characterised in that the enclosure is tightly packed with hollow microspheres which are compacted to a density where microspheres become a quasi-solid.

According to the invention there is also provided a submarine flowline comprising a pipeline, a group of pipelines, or combination of pipeline(s) and associated equipment located within an impermeable enclosure with a space between said enclosure and flowline, characterised in that the space is filled with tightly packed microspheres which are compacted to a density where the microspheres become a quasi-solid.

The invention also provides a method of installing or recovering marine or submarine apparatus comprising the step of filling an enclosure associated with said apparatus with microspheres characterised in that the microspheres are tightly packed and are compacted to a density where the microspheres become a quasi-solid.

It is to be understood that the term "apparatus" refers to individual pieces of equipment, structures or combinations of the aforesaid and the like.

Preferred embodiments of the invention will now be described, by way of example only, with reference to the accompanying drawings, in which.

Figure 3:
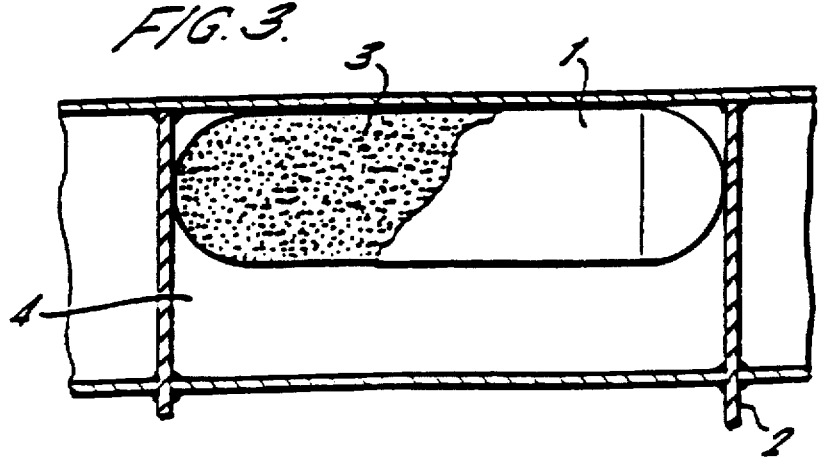

FIG. 3 side elevation of a cross-section of a piece of underwater equipment according to the invention showing a buoyancy enclosure enclosed in a compartment of the equipment.

Figure 6:
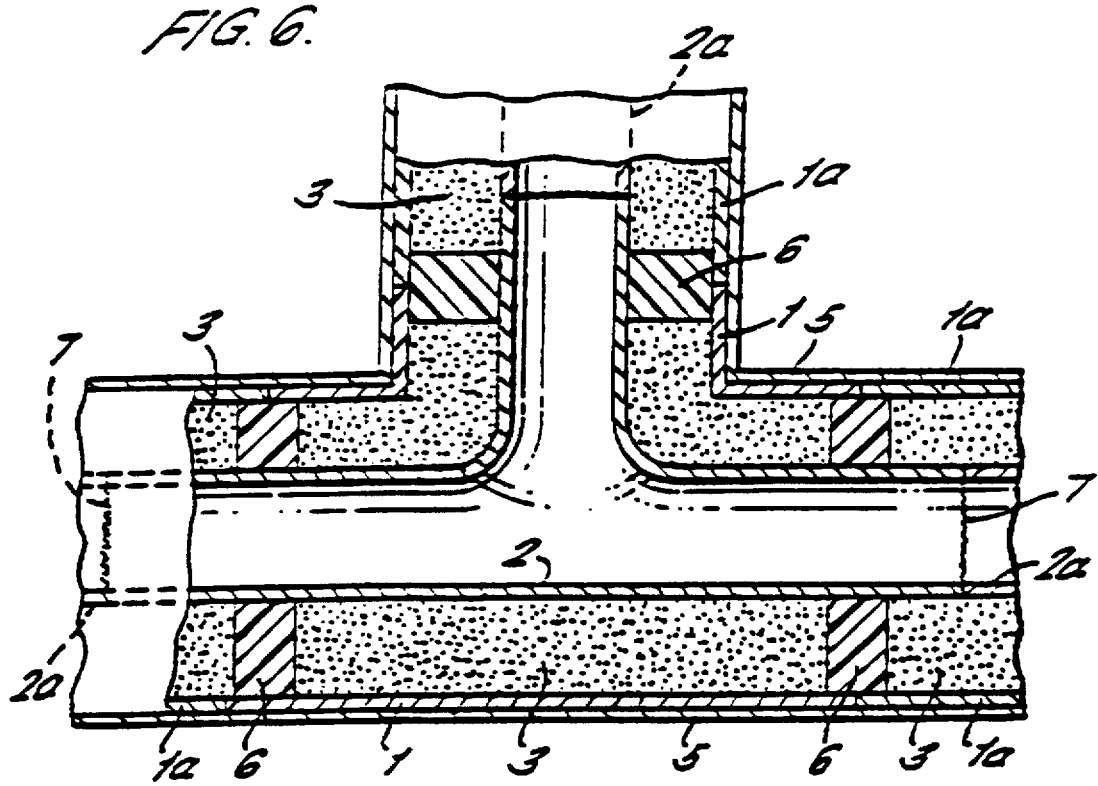
Figure 7:
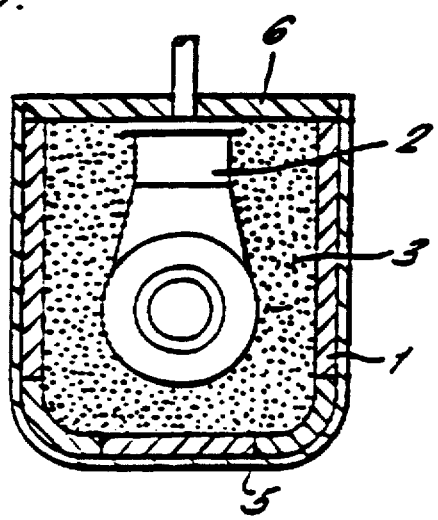
Figure 8:
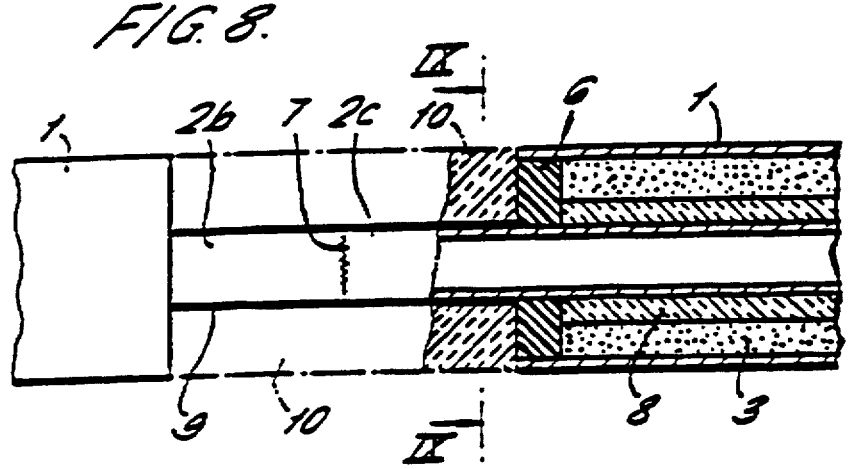
Figure 9:
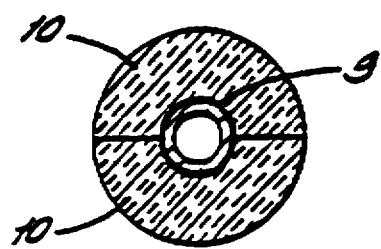
Figure 10:
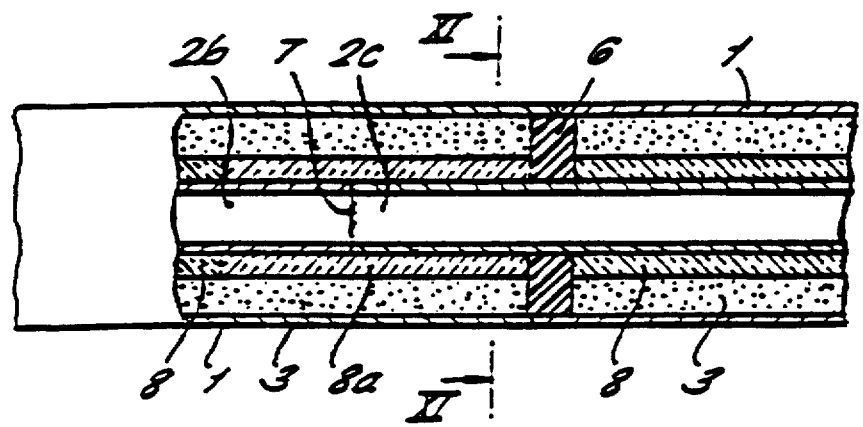
Figure 11:
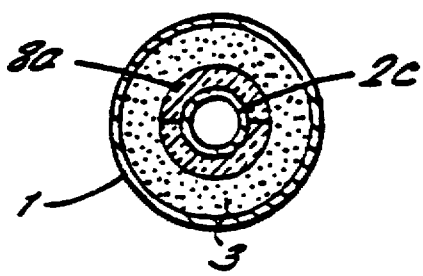
Figure 12:
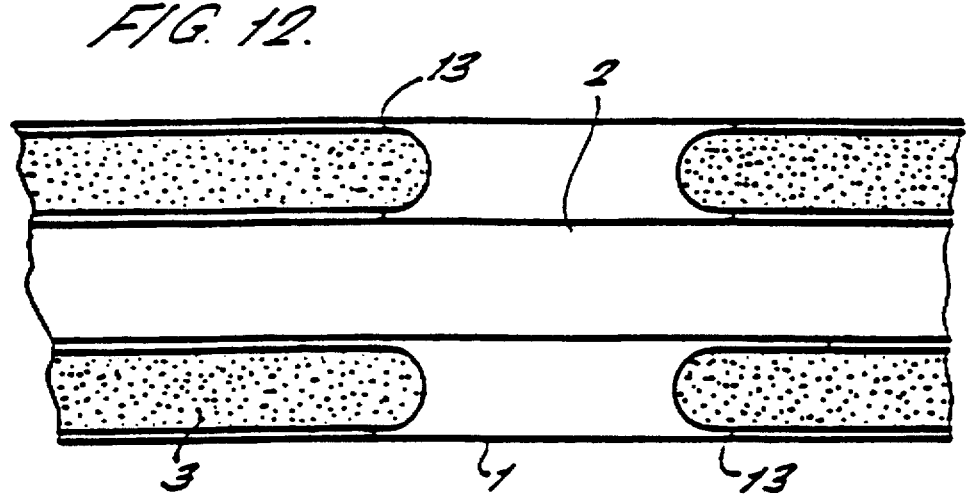
Figure 13:
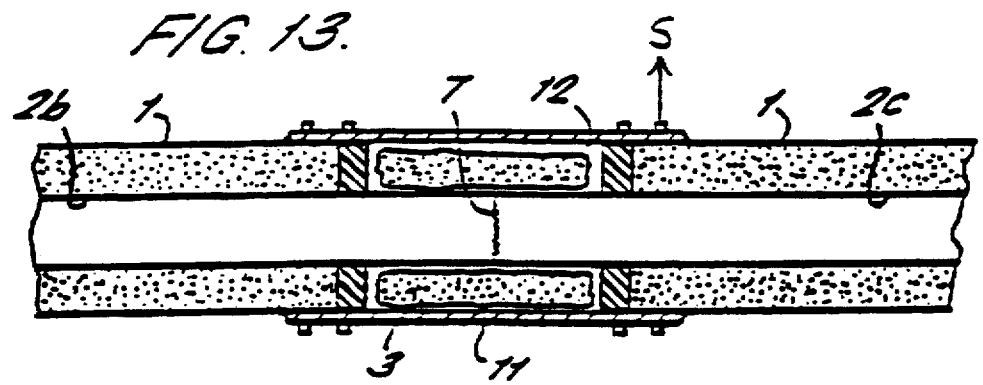
Figure 14:
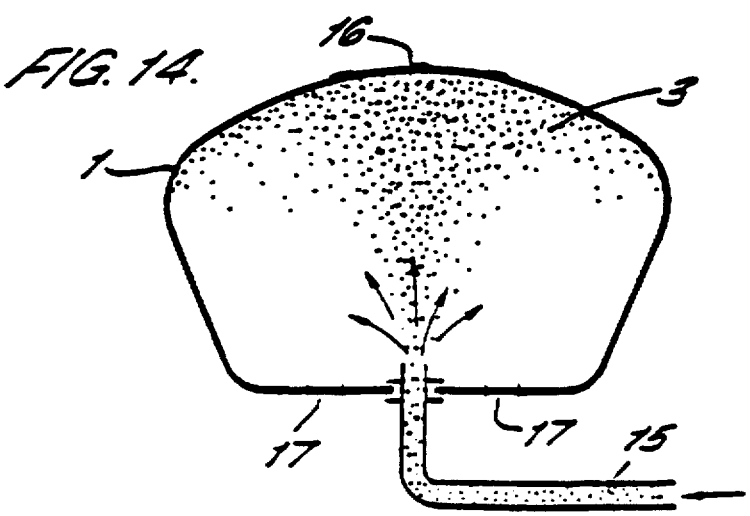
Figure 15:
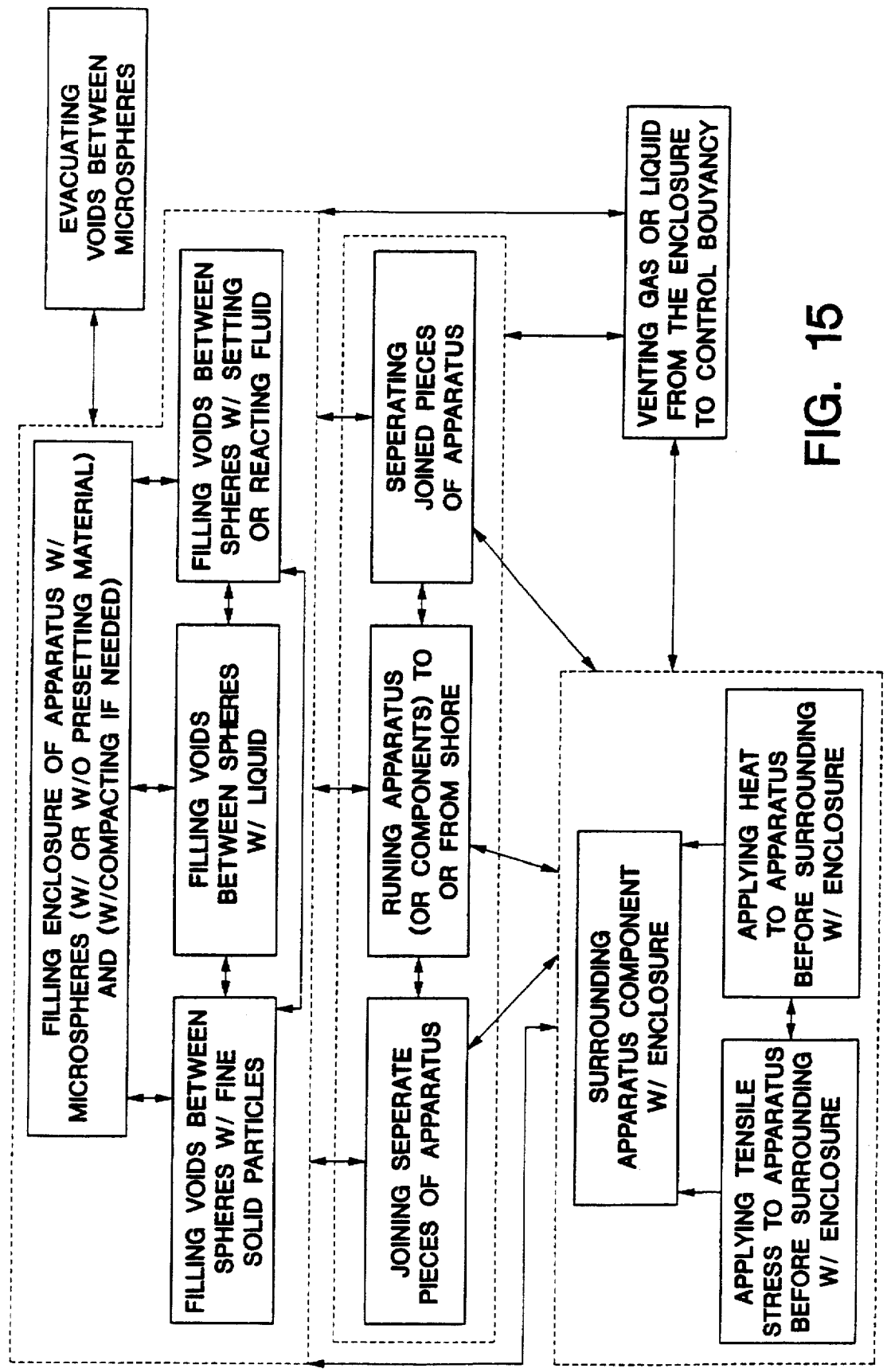

FIG. 4 is a side elevation of a cross-section of a piece of underwater equipment according to the invention surrounded by a buoyancy enclosure;

FIG. 4a is an end elevation of a cross-section of FIG. 4 taken on the line IV—IV;

FIG. 5 is a side elevation of a cross-section of a piece of underwater equipment according to the invention surrounded by a buoyancy enclosure;

FIG. 5a is an end elevation of a cross-section of FIG. 5 taken on the line V—V;

FIG. 6 is a side elevation of a cross-section of a pipeline according to the invention surrounded by a buoyancy enclosure;

FIG. 7 is a side elevation of a cross-section of a valve assembly according to the invention surrounded by a buoyancy enclosure;

FIG. 8 shows a side elevation of a partial cross-section of a pipeline according to the invention surrounded by a buoyancy enclosure;

FIG. 9 is an end elevation of a cross-section of FIG. 8 taken on the line IX—IX;

FIG. 10 shows a side elevation of a partial cross-section of a pipeline according to the invention surrounded by a buoyancy enclosure;

FIG. 11 is an end elevation of a cross-section of FIG. 8 taken on the line XI—XI;

FIG. 12 is a side elevation of a cross-section of a pipeline according to the invention showing a thermal strain resisting bulkhead;

FIG. 13 is a side elevation of a cross-section of a pipeline according to the invention showing a field joint;

FIG. 14 is a side elevation of a cross-section of a buoyancy enclosure being filled with microspheres; and FIG. 15 is a schematic depiction of method steps of the present invention which has been provided for illustration purposes only and is not meant to limit in any fashion the disclosure and illustration of the present application.

Figure 1:
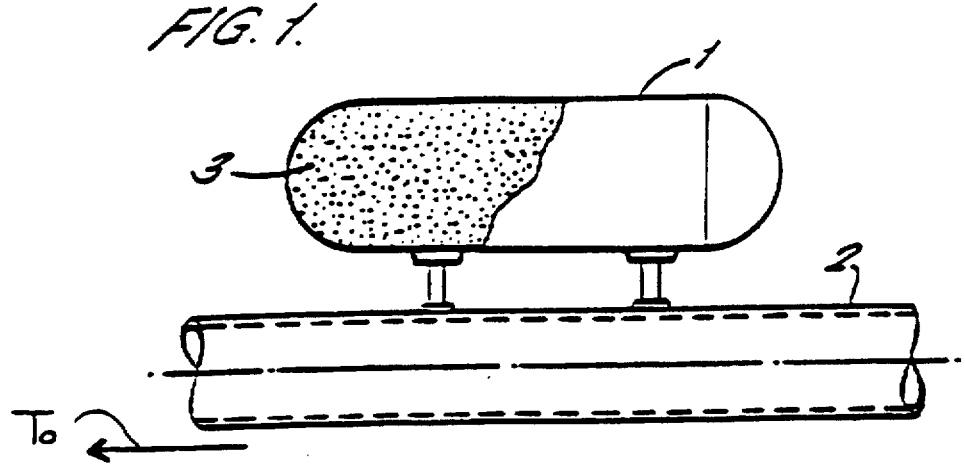
FIG. 1 is a side elevation of a piece of underwater equipment according to the invention to which is attached a buoyancy enclosure, a part of which has been cut away for ease of reference.

Referring to FIG. 1, there is shown an item of underwater equipment (2), such as a piece of pipeline, to which is attached an impermeable enclosure (1) containing tightly packed hollow ceramic microspheres (3) and sealed to prevent the ingress of water. The enclosure may be made of an elastomeric material, such as rubber or a rubber fabric composition, or a more rigid material such as steel. A wide range of materials are suitable for the construction of the enclosure (1). Suitable elastomeric materials such as polyethylene, polyurethane, polyvinalchloride, polyolefines, glass reinforced resins, SBR or EPDM. The construction and thickness of the enclosure (1) should be such as to avoid tearing and may, incorporate one or more layers of reinforcing material or a wound wire or textile chord. Reinforcing ribs or slats may be incorporated to stiffen the enclosure (1). The void space within the enclosure (1) surrounding the microspheres (3) may be filled with a vacuum or a gas or liquid such as air or water. The enclosure (1) can be attached to the structure (2) and filled prior to its installation in the water.

The structure (2) can be made positively buoyant or of reduced submerged unit weight, by adjusting the volume of the microspheres (3) in the enclosure (1) or by adding a liquid to fill the surrounding voids. The structure can then be towed to its installation site by an appropriate towing method for installation.

The ceramic microspheres (3) are preferably alumina silicate and have a preferred particle specific gravity of approximately 0.7. The microspheres have a bulk specific density less than that of water and which is preferably in the range of 0.37 to 0.8 g/cc when tightly packed with air contained in the void spaces between the microspheres (3). The preferred bulk specific density is in the range of 0.42 to 0.49 g/cc. The microspheres have a diameter in the region of 5 to 1000 microns, the actual particle size being selected according to the use of the invention.

The microspheres (3) are tightly packed to a density where, when submerged in use, the internal pressure on the microspheres is greater than or substantially equal to the water pressure on the structure (2). It is to be understood that where the structure is only partially submerged, the water pressure referred to is on the submerged part. The microspheres (3) entrained with gas or air in the enclosure (1), which is effectively impermeable to the surrounding water or air, thus prevent the compression and collapse of the enclosure (1) when subjected to external hydrostatic pressure from the surrounding water. The microspheres (3) themselves have a collapsing pressure beyond that to which they would be subjected by the surrounding water during installation.

It should be understood that the term "tightly packed" is used to mean that when the microspheres (3) are compressed, they exert pressure on the surrounding enclosure (1). If the compressive force is removed, the microspheres (3) stay compacted and continue to exert pressure on the enclosure (1). It is believed that there is an internal pressure or stress exerted on the microspheres (3). After a certain pressure or compacted density is obtained, the microspheres (3) tend to act more like a solid and cease to flow. When compacted to behave like a solid, the microspheres (3) are capable of carrying the shear transmitting stress. It is in this way that the microspheres (3) assist in forming a compliant structure which is able to resist external pressure and to carry externally applied forces and moments. This feature is more relevant in the embodiments described below, where the enclosure (1) partially or completely surrounds the structure (2).

Although the microspheres are tightly packed when the structure is submerged in use, they may not be so tightly packed before submergence. This will obviously depend on the circumstances of use of the invention. However, once the apparatus or structure is submerged, the microspheres become tightly packed.

The voids between the microspheres (3) can be filled with a fluid, such as water, rather than air, in which case the buoyancy provided remains constant, irrespective of increases or decreases of externally applied pressure due to changes in water depth.

Figure 2:
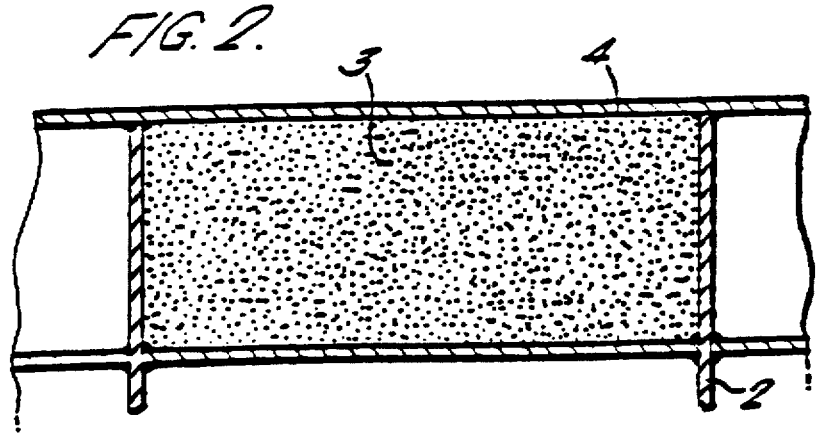
FIG. 2 is a side elevation of a cross-section of a piece of underwater equipment according to the invention in which a buoyancy enclosure is provided by a compartment of the equipment.

In an alternative embodiment of the invention illustrated in FIG. 2, the buoyant enclosure (1) is provided by a compartment (4) which is a part of the structure (2) itself. Alternatively, as shown in FIG. 3, the buoyant enclosure (1) can be located within a compartment (4) of the structure (2).

Referring now to FIGS. 4, 4a, 5 and 5a, the enclosure (1) is preferably shaped so as to partially or completely surround the structure (2). The resultant structure is a compliant structure to which the packed microspheres (3) provide not only buoyancy, but also structural strength and protect the structure (2) from damage. The tightly packed microspheres (3) have the effect of increasing the collapse pressure of the enclosure (1) against, in particular, cylindrical collapse. The microspheres (3) when tightly packed into the enclosure (1) "grip", through friction, the structure (2) and thus hold it in position within the enclosure (1). This is particularly important where the structure (2) could be subjected to bending. Where the structure (2) is subjected to bending, the resulting shear stress is transferred across the enclosure (1) to the structure (2), and vice versa, helping to reduce or eliminate damage and buckling of the structure (2) inside. The buckling limit due to bending is increased by the use of the tightly packed microspheres (3) which thus maintain a uniform cross-section (particularly of the enclosure (1)) to a greater bending moment.

Water pressure will also serve to increase structural strength by causing further compaction of the microspheres (3). The internal surface of the enclosure (1) and the external surface of the structure (2) may also be coated to increase the friction factor.

These embodiments of the invention have a further additional advantage in that the enclosure (1) filled with microspheres (3) provides thermal insulation to the structure (2).

In order to further improve the thermal insulation, the void space around the microspheres (3) can be filled with a resin, polymer or other suitable bond setting material. Such a bonding material may be introduced as a liquid, which then sets to form with the microspheres a consolidated material. Instead of filling the enclosure (1) first with spheres and then injecting the bond setting material, the mixing of microspheres and bonding liquid may be carried out prior to the filling of the enclosure (1). The resulting solid matrix helps strengthen the structure and also prevents convection around the microspheres and improves the thermal insulation. Alternatively the voids may be filled with fine particle solids, such as dry cement, corrosion inhibitor or talc. (note—in this embodiment, reference no. 3 generally represents both the microspheres and the fine particles filling in the voids between those microspheres) This helps to eliminate convection within the enclosure (1) and assists the thermal insulation. If dry cement is used, water can subsequently be added which causes the cement to set and harden. The cement also strengthens the structure and helps to minimise mechanical damage thereto. The internal surface of the enclosure (2) may be grooved, routed, roughened or provided with a friction coating to provide suitable keying for the bonding material or cement to further strengthen the enclosed structure (2). This also helps to increase the tensile and compressive strength of the overall structure, and also the shear strength.

The roughening, grooving, routing and friction coating can also be used in the embodiment of the invention utilising dry microspheres (3) as it helps to prevent movement of the microspheres (3).

In these embodiments of the invention, the material of the enclosure (1) can also be chosen to further improve the achievable thermal insulation. If desired, the structure (2) may also be coated with a thermal insulation material and/or an anti-corrosion material underneath the enclosure (1).

The enclosure (1) can be a simple sleeve, or in the form of, say, an annulus. In the latter example, the inner surface of the annulus can be bonded to the structure (2).

Referring now to FIGS. 6 and 7 there is shown a structure (2), being a pipeline T piece and a valve assembly respectively, surrounded by an enclosure (1) which is filled with tightly packed microspheres (3). The enclosures (1) are surrounded with an external cover (5) to prevent damage to the enclosure (1).

Obviously although only a single structure (2) is illustrated in the enclosure (1), the invention is equally applicable to a plurality of structures (2) in a single enclosure (1).

When installed, the structure (2) may be required to be joined end to end with a further structure (2a) by a welded connection (7), as shown in FIG. 6, or a flanged or other mechanical connection. Each structure (2, 2a), such as two pipelines, is located within a surrounding enclosure (1). The enclosures (1) may either terminate short of each end of the respective structure, or alternatively, as illustrated in FIG. 6, may be abutted and adjoined to an adjacent jacket (1a) following the welding of the structures (2, 2a).

End caps (6) may be used which circumferentially surround the structure (2), or an end thereof to create compartments within the enclosure (1). If desired, the end caps (6) may be secured to the structure (2, 2a) by a suitable adhesive and they may also be bonded to the enclosure (1), either by adhesive or by co-curing the enclosure (1) and the end cap (6) to form an integral assembly. Where a bonding material is to be introduced into the microsphere void space, the end caps (6) need only be temporary. The end caps may also feature holes, diaphragms or valves, where necessary, to assist with the filling of the enclosure (1).

The end caps (6) are made of a suitable rubber or plastic materials such as SBR (Trade Mark), EPDM (Trade Mark), polyethylene, polyvinalchloride, polyurethane, polyolefines or glassed reinforced resins. When the structure (2) is likely to be subjected to a high temperature, it is preferred that a heat resistant material is used for at least the radially inner part of each cap (6). The dimensions and materials from which the enclosure (1), cover (5), end cap (6) are fabricated will be chosen to suit the anticipated structure, operating temperature and other design requirements.

Referring to FIGS. 8 and 9, there is shown a structure made up of two pipes (2b, 2c) joined end to end by a welded connection (7). Each pipe (2b, 2c) is located within a surrounding elongated enclosure (1), which terminates short of each end of the respective pipe (2b, 2c). The enclosures (1) extend between end caps (6) which circumferentially surround the pipe (2b, 2c) similar to those mentioned above. Within the enclosure (1), the pipe (2b, 2c) is covered with a layer of thermally insulating material (8). The space between the pipe (2b, 2c) or the insulating layer (8) and the enclosure (1) contains tightly packed microspheres (3). To protect the welded region of the pipes (2b, 2c) between the enclosures (1), the region is wrapped with a suitable shrink wrap material (9). This is then be covered by two semi-cylindrical thermal insulation segments (10) which surround the pipe and are held in place by any suitable means such as adhesive or circumferential straps. Multiple cylindrical segments may be used. Alternatively, the welded region may simply be left exposed.

FIGS. 10 and 11 show a similar arrangement to that shown in FIGS. 8 and 9, except in that the enclosures (1)

surrounding adjacent pipes (2b, 2c) are abutted following the welding of the pipes (2b, 2c) and the application of a corrosion protective wrap thermal insulation layer (8a) to the welded region.

The enclosure (1) of FIGS. 8–11 may also have an optional external cover (5) which is either continuous or extends between the end caps (6).

It is also envisaged, as mentioned above, that the invention extends to cover the use of a single enclosure (1) surrounding a plurality of structures or groups of structures. This is particularly applicable where the structures are pipelines.

Where the pipeline is laid from a lay vessel, tension is applied to the pipeline by gripping the outside of the enclosure (1) which compresses the microspheres (3) which carry/transmit the shear force and thus tension to the enclosed pipeline. The pressure from the tension increases the ability of the microspheres to transmit the sheer force, but it also has a triaxial effect.

When a structure, such as a submarine pipeline made of a number of section of pipes, is to be installed, it is often necessary to include a number of joints, say every 12 or 24 meters. These may be joints as described above or a combination of the features described previously. In the application described in FIG. 8, the shrink wrap (9) and thermal insulating segments (10) may be omitted. FIG. 13 illustrates a field joint around a welded connection 7 in which a sheet steel wrap (11) is welded or affixed to the outside of the non-abutting enclosures (1) and the resulting cavity (12) between the pipes (2b, 2c) and sheet steel wrap (11) is filled with microspheres (3), either free filled or in a pre-filled and pre-shaped bag.

A particular problem associated with submarine pipelines is that they are susceptable to upheaval buckling, where compressive forces are induced in the pipeline when it is fully or partly restrained from expanding as the temperature of the pipeline is increased above the temperature at which it is installed. Although a compliant structural strength is provided by the tightly packed microspheres (3) and the weight of the pipeline helps to counteract bulk buckling, the susceptability of the pipeline to such buckling can be further minimised or eliminated by first tensioning the pipe by the application of a force at each end thereof (see tension T in FIG. 4), surrounding the pipeline with the enclosure (1) and filling the enclosure (1) with the microspheres (3) and/or microspheres (3) and bonding liquid or compound as described above. The tensile force must be applied to a sufficient magnitude and held for a sufficient time to permit the bonding liquid or compound to set and harden and bond to the pipe or group of pipes. When the applied force has been released the pipe will be prevented from contracting, thus locking in tensile stress into the pipe. In an alternative method, the pipe may first be heated (see applied heat as schematically represented by H in FIG. 4), to a predetermined temperature which gives rise to thermal expansion, before being surrounded by the enclosure (1) and microspheres (3) with the bonding liquid or compound. The temperature should be maintained for sufficient time to permit the bonding liquid or compound to set and harden and bond the pipe. When the pipe is allowed to cool, the pipe will be prevented from contracting.

When pretensioning structures containing dry microspheres, the microspheres must be compacted to an appropriate pressure first.

Where the pipeline is of a significant length, thermal strain resisting bulkheads should be included, say every 200 meters. These may be as illustrated in FIG. 12. Alternatively, the solid steel sleeve may be replaced by a two part sleeve, the parts of which are separated by thermal insulation to minimise the heat loss therefrom.

The microspheres (3) may be introduced into the enclosure (1) in a manner as shown in FIG. 14. The microspheres (3) are entrained in a gas, such as air, or a liquid, such as water, which is utilised as a transmission medium and injected with a suitable pipe means (15) into the enclosure (1). In the case of gas, this may be allowed to escape from a vent valve or plurality of vent valves (16) suitably located in the enclosure (1). The vent valves (16) should be designed so as to allow the expulsion of the gas, but not the microspheres (3). In the case of a liquid, such as water, this may be allowed to escape from one or more orifices (17) located in the base of the enclosure (1) or another suitable location. This venting can be used to control the buoyancy of the structure (2).

Although in the embodiments of the invention described previously the enclosure (1) has been filled with the microspheres (3) prior to towing or installation, in certain other embodiments of the invention it is preferable to effect the filling of the enclosure (1) after the structure (2) has been towed to an appropriate installation site and prior to submergence. Alternatively, the structure (2) may first be submerged and then the enclosure (1) filled with the microspheres (3). In some cases the microspheres (3) are just introduced into sections of the enclosure (1) or along the entire length of the structure (2). Obviously the order of towing, filling and submerging will depend on the design of the structure (2), whether it is positively or negatively buoyant without the microspheres (3) and whether the microspheres (3) are required to help to regulate the buoyancy or just to provide the thermal insulation and/or structural strength benefit.

Where the recovery of equipment is required, an enclosure (1) may be attached or inserted into the structure (2) which is then provided with sufficient buoyancy to be raised and towed (see tow reference To in FIG. 1). It may be necessary, depending on the application of the structure (2) to first separate previously joined pieces of the structure.

It is to be understood that the use of the terms "submarine" and "marine" do not just apply to sea applications. The invention also applies to apparatus which can be used in lakes, estuaries, shore approaches and the like. The submarine pipelines referred to can be water pipelines, fuel supply lines, chemical lines and the like.

I claim:

1. Marine or submarine apparatus comprising an impermeable enclosure, characterised in that the enclosure is tightly packed with hollow microspheres which are compacted to a density at which the microspheres:

cease to flow and act more like a solid within the impermeable enclosures;

carry moments and forces applied externally to said impermeable enclosure;

carry shear stress; and exert pressure on the impermeable enclosure.

2. Marine or submarine apparatus as claimed in claim 1 in which the microspheres are of a ceramic material.

3. Marine or submarine apparatus as claimed in claim 1 in which the microspheres have a particle diameter in the range 5 to 1000 microns.

4. Marine or submarine apparatus as claimed in claim 1 in which the bulk specific density of the microspheres is less than or equal to that of water.

5. Marine or submarine apparatus as claimed in claim 1 in which the microspheres are compacted to a density which would give a bulk specific density of 0.37 to 0.8 g/cc with the microspheres being packed together with air in voids between the microspheres.

6. Marine or submarine apparatus as claimed in claim 5 in which the microspheres are compacted to a density which would give a bulk specific density of 0.42 to 0.49 g/cc with the microspheres being packed together with air in voids between the microspheres.

7. Marine or submarine apparatus as claimed in claim 1 in which voids formed between the microspheres are filled with fine particle solids.

8. Marine or submarine apparatus as claimed in claim 1 in which voids formed between the microspheres are filled with a solid matrix after the microspheres have been compacted.

9. Marine or submarine apparatus as claimed in claim 1 in which voids formed between the microspheres are filled with a vacuum, gas or liquid.

10. Marine or submarine apparatus as claimed in claim 1 in which the enclosure is rigid.

11. Marine or submarine apparatus as claimed in claim 1 in which the enclosure is of a thermally insulation material.

12. Marine or submarine apparatus as claimed in claim 1 in which the apparatus is coated with a thermal insulation layer.

13. Marine or submarine apparatus as claimed in claim 1 in which the enclosure represents an external surface of said apparatus.

14. Marine or submarine apparatus as claimed in claim 1 further comprising a marine or submarine structure and said enclosure forms a component of said marine or submarine structure.

15. Marine or submarine apparatus as claimed in claim 1 in which the enclosure is surrounded by an external cover.

16. Marine or submarine apparatus as claimed in claim 1 further comprising a marine or submarine structure and said enclosure comprises a jacket which surrounds the marine or submarine structure and end caps to close one or more ends of the jacket.

17. Marine or submarine apparatus as claimed in claim 1 further including end caps for creating compartments within the enclosure.

18. Marine or submarine apparatus as claimed in claim 1 wherein the hollow microspheres are alumina silicate microspheres.

19. Marine or submarine apparatus as recited in claim 1 wherein said apparatus includes a compliant structure and said impermeable enclosure is positioned with respect to said compliant structure to assist in controlling deflection of said compliant structure based upon said microspheres being so densely packed as to form a solid block which in and of itself exerts pressure on the surrounding enclosure.

20. Marine or submarine apparatus as claimed in claim 1 further comprising a marine or submarine structure and said enclosure including a jacket that surrounds said marine or submarine structure.

21. A submarine flowline comprising an impermeable enclosure and a pipeline, a group of pipelines or a combination of pipeline(s) and associated equipment located within the impermeable enclosure with a space defined between said impermeable enclosure and the pipeline(s) and any associated equipment therein, characterised in that the space is filled with tightly packed microspheres which are compacted to a density at which the microspheres:

cease to flow and act more like a solid within the impermeable enclosure;

carry externally applied moments and forces;

carry shear stress and transfer shear stress from the enclosure to the pipeline(s) and vice versa;

exert pressure on the impermeable enclosure; and frictionally engage the pipeline(s) and any associated equipment to hold the pipeline(s) and the associated equipment in position relative to the impermeable enclosure.

22. A submarine flowline as claimed in claim 21 further comprising joints and thermal strain resisting bulkheads at intervals along the submarine flowline.

23. A submarine flowline as recited in claim 21 wherein said pipeline includes a pretensioned pipe and said impermeable enclosure at least partially encircles the pretensioned pipe such that said tightly packed microspheres lock in tensile stress in said pretensioned pipe.

24. A submarine flowline as claimed in claim 21, wherein the impermeable enclosure is rigid.

25. A method of installing or recovering marine or submarine apparatus comprising the step of filling an impermeable enclosure of the apparatus with microspheres characterised in that the microspheres are tightly packed and are compacted to a density at which the microspheres:

cease to flow and act more like a solid within the impermeable enclosure.

carry externally applied moments and forces;

carry shear stress; and exert pressure on the impermeable enclosure.

26. A method as claimed in claim 25 further comprising the step of filling voids formed between the microspheres with fine solid particles.

27. A method as claimed in claim 25 further comprising the step of further filling the enclosure with a liquid.

28. A method as claimed in claim 25 comprising the step of further filling the enclosure with a fluid which sets or reacts with another material to set to form a solid matrix around the microspheres after the microspheres have been compacted.

29. A method as claimed in claim 25 in which the microspheres are mixed with a settable material prior to filling the enclosure, which settable material sets only after the microspheres have been compacted.

30. A method as claimed in claim 25 further comprising the step of filling voids formed between the microspheres with a gas.

31. A method as claimed in claim 25 further comprising the step of towing the apparatus to an offshore location.

32. A method as claimed in claim 25 further comprising the step of joining separate pieces of said apparatus and their enclosures.

33. A method as claimed in claim 25 further comprising the step of separating joined pieces of said apparatus.

34. A method as claimed in claim 25 further comprising the step of first surrounding a component of the marine or submarine apparatus with the enclosure.

35. A method as claimed in claim 25 further comprising the step of applying a tensile stress to said component to be located within the enclosure before surrounding the component with the enclosure.

36. A method as claimed in claim 25 further comprising the step of heating the component to be located within the enclosure before surrounding the component with the enclosure.

37. A method as claimed in claim 25 further comprising the step of venting gas from the enclosure to control buoyancy of the apparatus.

38. A method as claimed in claim 25 further comprising the step of evacuating the voids between the microspheres.

39. A method as claimed in claim 25 further comprising the step of venting liquid from the enclosure to control buoyancy of the apparatus.

40. A method as claimed in claim 25 further comprising the step of evacuating voids.

41. Marine or submarine apparatus, comprising:

underwater equipment which includes a transportation line; and an impermeable enclosure associated with said underwater equipment, said impermeable enclosure being tightly packed with microspheres which are compacted to a density whereby said microspheres exert pressure on the surrounding enclosure such that the microspheres cease to flow and act more like a solid; wherein:

said transportation line includes a pipeline comprised of a single pipe or a series of interconnected pipes, said enclosure at least partially surrounding a pipe in said pipeline such that said microspheres carry shear transmitting stress in said transportation line.

42. Marine or submarine apparatus as recited in claim 41 wherein said pipe is a pretensioned pipe and said enclosure contacts said pretensioned pipe so as to lock in tensile stress in said pretensioned pipe.

43. Marine or submarine apparatus comprising a rigid impermeable enclosure, characterised in that the enclosure is tightly packed with hollow microspheres which are compacted to a density which has a bulk specific density of 0.37 to 0.8 g/cc with the microspheres being packed together with air in voids between the microspheres such that the microspheres:

cease to flow and act more like a solid within the rigid impermeable enclosure;

carry moments and forces applied externally to the impermeable enclosure;

carry shear stress; and exert pressure on the rigid impermeable enclosure.

44. A submarine flowline comprising a rigid impermeable enclosure and a pipeline, a group of pipelines, or a combination of pipeline(s) and associated equipment located within the rigid impermeable enclosure with a space defined between said rigid impermeable enclosure and the pipeline (s) and any associated equipment therein, characterised in that the space is filled with tightly packed microspheres which are compacted to a density which has a bulk specific density of 0.37 to 0.8 g/cc with the microspheres being packed together with air in voids between the microspheres such that the microspheres:

cease to flow and act more like a solid within the impermeable enclosure;

carry externally applied moments and forces;

carry shear stress and transfer shear stress from the enclosure to the pipeline(s) and vice versa;

exert pressure on the impermeable enclosure; and frictionally engage the pipeline(s) and any associated equipment to hold the pipeline(s) and the associated equipment in position relative to the impermeable enclosure.

45. A method of installing or recovering a marine or submarine apparatus which has an impermeable enclosure which comprises the steps of:

filling the impermeable enclosure with hollow microspheres;

compacting the hollow microspheres to a density at which the microspheres cease to flow and act more like a solid within the enclosure; and applying a tensile stress to a component of the apparatus located within the impermeable enclosure prior to enclosing such component within the impermeable enclosure.

46. Marine or submarine apparatus, comprising:

underwater equipment which includes a transportation line;

an impermeable enclosure associated with said underwater equipment, said impermeable enclosure being tightly packed with microspheres which are compacted to a density at which the microspheres exert pressure on the surrounding enclosure such that the microspheres cease to flow and act more like a solid; wherein:

said transportation line includes a pipeline comprised of a single pipe or a series of interconnected pipes, said enclosure at least partially surrounding a pipe in said pipeline such that said microspheres carry shear transmitting stress in said transportation line; and said pipe is a pretensioned pipe and said enclosure contacts said pretensioned pipe so as to lock in tensile stress in said pretensioned pipe.

47. A submarine flowline comprising an impermeable enclosure and pipeline, a group of pipeline(s) or combination of pipeline(s) and associated equipment located within the impermeable enclosure with a space defined between said impermeable enclosure and the pipeline(s) therein, wherein:

the space is filled with tightly packed microspheres which are compacted to a density at which the microspheres cease to flow and act more like a solid within the enclosures; and said pipeline includes a pretensioned pipe and said impermeable enclosure at least partially encircles the pretensioned pipe such that said tightly packed microspheres lock in tensile stress in said pretensioned pipe.

\* \* \* \* \*